United States Patent Office 2,777,833
Patented Jan. 15, 1957

2,777,833

HIGH PRESSURE POLYMERIZATION PROCESS FOR ETHYLENE-1-CHLORO-1-FLUOROETHYLENE COPOLYMERS

William R. Richard, Jr., Dayton, Ohio, assignor to Monsanto Chemical Company, St. Louis, Mo., a corporation of Delaware No Drawing. Application November 28, 1952, Serial No. 323,123

6 Claims. (Cl. 260—87.7)

This invention relates to the polymerization of ethylene at high pressures in admixture with minor amounts of 1-chloro-1-fluoroethylene in an aqueous medium. In a specific aspect the invention effects improvement in the characteristics of normally solid "polyethylene" prepared at high pressure in the presence of water, by the inclusion of small amounts of 1 - chloro - 1 - fluoroethylene as a comonomer with the ethylene. In another aspect the invention relates to the production of a copolymer having the general characteristics of polyethylene, i. e., normally solid, waxy in feel, showing some crystallinity by X-ray diffraction, yet improved in physical properties by inclusion of relatively small proportions of 1 - chloro - 1 - fluoroethylene units in the polyethylene molecule.

It has long been known to subject ethylene to polymerization at high pressures of the order of at least 500 atmospheres and often up to 40,000 or 50,000 pounds per square inch, with or without the use of small amounts of oxygen or organic peroxide catalysts, thereby producing a normally solid waxy polymer of high molecular weight ranging from 6,000 up to 20,000 or 40,000 and showing the presence of crystalline material by X-ray diffraction analysis. Material prepared in this manner and having these general properties is now commonly termed "polyethylene" and is a very important product in the plastics industry. It was also suggested long ago to employ various unsaturated materials as comonomers along with the ethylene in high pressure polymerization.

The production of a polyethylene having sufficiently good physical properties to make it a saleable commercial product is not easy. The molecular weight, the presence or absence of cross-linking and branching, the stability of the product toward oxidation and other degradation, are all sensitive to fairly minor variations in reaction conditions. Even the best commercial polyethylenes leave something to be desired in their physical properties. It would be of great practical importance to find a simple means of improving such properties, and particularly of permitting the production of commercial grade polyethylene under reaction conditions which do not ordinarily give a satisfactory commercial product.

Attempts have been made to solve some of these problems by employing added liquid organic reaction media, for example benzene or tertiary butyl alcohol, which result in modifying the polymer and making it more processable. However, such organic liquids are expensive, their recovery and reuse are expensive, and it is exceedingly difficult to remove them entirely from the polymer product. Employment of water as a reaction medium, although advantageous for heat removal and catalyst metering, has been unsuccessful in producing at moderate reaction temperatures a product which is satisfactory from the commercial viewpoint. Thus, as described in U. S. Patent No. 2,542,783, polymerizing ethylene in an aqueous emulsion at temperatures such as 40 to 120° C. is not satisfactory, the polymers being of poor mechanical properties and having poor flow characteristics. As further stated in said patent, polymerizing at above 120° C. is not satisfactory unless, in accordance with the process described in that patent, an added water-soluble salt of a high molecular weight polymer of a carboxylic acid is used. Thus, it is desirable to provide some means of effecting production of solid polyethylene-type materials by polymerizing ethylene in the presence of water yet employing reasonably low temperatures, particularly temperatures below the 200° C. principally employed in the process of the cited patent.

An object of this invention is to provide improved polyethylene-like materials. Another object of the invention is to provide improved processes for the polymerization of ethylene at high pressures in the presence of water. A further object is to provide a comonomer for ethylene which, when used in relatively minor amount along with the ethylene during high pressure polymerization with an aqueous reaction medium greatly improves the physical properties of resulting normally solid polymers. Another object is to provide a process for making a polyethylene-type product which mills easily and is easily molded in conventional equipment. Another object is to provide a polymer which does not become brittle and grainy on reprocessing. Further objects and advantages of the invention will be apparent, to one skilled in the art, from the accompanying disclosure and discussion.

In accordance with this invention in preferred embodiment, a monomeric material comprising ethylene and 1-chloro-1-fluoroethylene is subjected to copolymerization at an elevated pressure, preferably at least 5,000 pounds per square inch, in the presence of an aqueous reaction medium, under conditions of temperature and catalyst resulting in the production of normally solid polymer. Ordinarily the monomeric mixture comprises from 95 to 70 weight percent ethylene and from 5 to 30 percent 1-chloro-1-fluoroethylene. However, larger proportions of the latter can be employed, for example 70 to 55 weight percent ethylene and 30 to 45 weight percent 1-chloro-1-fluoroethylene, and in such instances it is preferred to effect the polymerization at a pressure above 20,000 pounds per square inch and particularly above 40,000 pounds per square inch. Most frequently 1-chloro-1-fluoroethylene makes up not over 20 percent of the monomeric material. In accordance with a preferred aspect of my invention, ethylene and 1-chloro-1-fluoroethylene (sometimes called vinylidene chlorofluoride) are copolymerized in the presence of water and in the absence of a liquid organic reaction medium under high pressure to form a polymer which has physical properties superior to those of polyethylene made from only ethylene in the presence of water and under the same conditions. This is surprising inasmuch as vinyl fluoride and vinylidene fluoride copolymerize with ethylene under the same conditions to form cross-linked materials.

The polymerization can be carried out at temperatures within a fairly broad range, which is preferably 35° C. to 125° C. Higher temperatures tend to result in a discolored product, perhaps by decomposition of vinylidene chlorofluoride units in the polymer molecules. A temperature sufficiently high within the operative range should be used to give a reasonable reaction rate. The preferred range is 50 to 100° C. It is an advantage of this invention that such moderate temperatures can be used and yet polymers are produced that are readily processable as opposed to the unduly tough and grainy polymers made from ethylene at conditions identical except for the absence of vinylidene chlorofluoride.

While I consider a pressure of at least 5,000 pounds per square inch very desirable in carrying out my invention, pressures of at least 15,000 pounds per square inch are usually employed and much higher pressures are also suitable, for example above 40,000 pounds per square inch and up to say 200,000 pounds per square inch and even higher. A monomeric mixture of ethylene and 1-chloro-1-fluoroethylene containing less than 3 percent of the latter results in little significant improvement of product over that with ethylene alone. Proportions of 1-chloro-1-fluoroethylene within the range of from 5 to 30 percent ordinarily result in the greatest improvement of product. Amounts of 1-chloro-1-fluoroethylene above 25 percent in the total monomeric material tend to give a "cheesy" product when polymerized at pressures below 20,000 pounds per square inch. However, this somewhat undesirable effect can be compensated to an appreciable extent by employment of pressures above 20,000 pounds per square inch and particularly so by pressures above 40,000 pounds per square inch. Those skilled in the art, having had the benefit of the present disclosure, will readily choose a combination of monomer proportion and pressure as well as other reaction conditions best suited to give a product having characteristics desired for a particular use. In accordance with the invention, polyethylene-type polymers can be made which do not become brittle or grainy on reprocessing, which have good low temperature flexibility and which have high tensile elongation yet satisfactory tensile strength. The preferred effects on the polyethylene-like product are not found if the weight of 1-chloro-1-fluoroethylene in the monomeric mixture of same with ethylene becomes larger than the weight of the ethylene.

While ethylene can be copolymerized with 1-chloro-1-fluoroethylene within the broad aspects of the invention without the use of an added catalyst, it is much preferred to employ sufficient catalyst to give a reasonable reaction rate. Suitable catalysts are of the free-radical promoting type, principal among which are peroxide-type polymerization catalysts, and azo-type polymerization catalysts. Those skilled in the art are now fully familiar with a large number of peroxide-type polymerization catalysts and a suitable one can readily be chosen by simple trial. Such catalysts can be inorganic or organic, the latter having the general formula R'OOR" wherein R' is an organic radical and R" is an organic radical or hydrogen. These compounds are broadly termed peroxides, and in a more specific sense are hydroperoxides when R" is hydrogen. R' and R" can be hydrocarbon radicals or organic radicals substituted with a great variety of substituents. By way of example suitable peroxide-type catalysts include benzoyl peroxide, tertiary butyl peroxide, tertiary butyl hydroperoxide, diacetyl peroxide, diethyl peroxycarbonate, cumene hydroperoxide, among the organic peroxides; hydrogen peroxide, potassium persulfate, perborates and other peroxide-type catalysts. The azo-type polymerization catalysts are also well-known to those skilled in the art. These are characterized by the presence in the molecule of the group —N=N—; the dangling valences can be attached to a wide variety of organic radicals, at least one however preferably being attached to a tertiary carbon atom. By way of example of suitable azo-type catalysts can be mentioned $\alpha,\alpha'$-azodiisobutyronitrile, diazoaminobenzene, azobis-(diphenylmethane), and $\alpha,\alpha'$-azobis-$\alpha,\gamma$-dimethylvaleronitrile. The peroxy-type or azo-type polymerization catalyst is used in small but catalytic amounts, which are generally not in excess of 1 percent by weight based upon the monomeric mixture. A suitable quantity is often in the range of 0.05 to 0.5 percent by weight. The catalyst is advantageously introduced into the reaction dissolved or suspended in the water. It will of course be understood that one catalyst will not necessarily be the full equivalent of another in all respects.

The process of this invention can be carried out batchwise or continuously. The reaction mixture may consist of water, ethylene, 1-chloro-1-fluorotheylene and catalyst, or it may also include small amounts of other monomeric materials. In the case of a continuous reaction, the reaction mixture is preferably passed through an elongated coil provided with means for removing heat of reaction and capable of withstanding the high pressure required. I prefer to employ from 10 to 500 parts of water per 100 parts of total monomeric material. Sufficient agitation can be supplied, as by stirring a batch of reaction mixture or by passing a continuous stream of reaction mixture through a reaction zone at turbulent flow conditions, to result in intimate contact of water, monomers and catalyst. Known suspending or emulsifying agents can be added to produce a bead or a latex product. Unreacted monomeric material is recovered and recycled to the reaction.

The invention in its broadest aspects is not departed from by providing relatively minor amounts of other monomeric materials capable of entering into the polymerization reaction. Thus, vinyl chloride, vinyl acetate, propylene, styrene, and other unsaturated organic compounds can be used in quantity ranging up to a few percent. This of course will affect the polymer properties but the amount can be kept sufficiently low to retain the advantageous results of the use of 1-chloro-1-fluoroethylene as a comonomer with ethylene in the aqueous medium high pressure production of polyethylene-type materials.

The following information is submitted to exemplify the invention. However, it will be understood that the exact proportions, conditions and procedures described are not to be taken to limit the invention in its broadest aspects.

EXAMPLE 1

The following materials were charged to a stainless steel high pressure reactor:

|  | Grams |
|---|---|
| 1-chloro-1-fluoroethylene | 9 |
| Ethylene | 91 |
| Water | 150 |
| "Porofor-N" [1] | 0.1 |

[1] $\alpha,\alpha'$-Azodiisobutyronitrile.

The bomb was heated to 90° C., pressured to 16,000 pounds per square inch, and polymerization allowed to continue for 16 hours. Conversion to polymer was 45 percent.

The product was readily processed on a hot mill, and was easily molded in conventional equipment. Polyethylene made under the same conditions from ethylene alone could not be milled or molded due to the presence of large amounts of cross-linked materials.

EXAMPLE 2

Differences between polyethylene and ethylene-vinylidene chlorofluoride copolymer made in an aqueous medium at similar conditions are apparent from the following tables.

*Table I*

POLYMERIZATION

| Run | Monomer | Catalyst | Temp., °C. | Press., p. s. i. | Medium | Time, hrs. | Percent Yield |
|---|---|---|---|---|---|---|---|
| A | 60 g. ethylene+10 g. VCF.[1] | 0.1% Porofor N | 90 | 16,000 | Water | 16 | 64 |
| B | 50 g. ethylene | do | 90 | 16,000 | do | 16 | 68 |

[1] VCF is 1-chloro-1-fluoroethylene.

Table II
EVALUATION

| Material | Tensile Strength, p.s.i. | Tensile Elong., Percent | Clash Berg | | | Remarks |
| --- | --- | --- | --- | --- | --- | --- |
| | | | $T_f$, °C. | $T_{2000}$, °C. | Stifflex Range, °C. | |
| Copolymer A | 1,250 | 800 | −36.3 | +58.5 | 94.8 | Remolds and processes well. |
| Material representative of conditions used in Run B. | 1,980 | 47 | −8.5 | +107 | 115.5 | Poor processing characteristics. Ductility lowered by processing. |
| Commercial polyethylene. | 1,800 | 500 | −36.0 | +86.0 | 122 | Remolds and processes well. |

These data show adequate tensile strength and excellent elongation of the product made in accordance with the present invention, the latter being superior to that of the commercial polyethylene. It must be borne in mind that the conditions for the copolymerization were characteristic of those which produced a polyethylene unsuited for commercial use. The invention gave a product of excellent low temperature flexibility as shown by the Clash-Berg $T_f$ value.

While the invention has been described with particular reference to various preferred embodiments thereof, it will be appreciated that numerous modifications and variations are possible without departing from the invention.

I claim:

1. In the production of normally solid polymers by high pressure polymerization of ethylene in aqueous media, the improvement which comprises subjecting from 55 to 95 parts by weight ethylene and from 45 to 5 parts by weight 1-chloro-1-fluoroethylene to copolymerization in the presence of at least 10 parts by weight water as the sole reaction medium, at a temperature within the range of 35 to 125° C. and a pressure of at least 5,000 pounds per square inch with the further proviso that said pressure is at least 20,000 pounds per square inch when said 1-chloro-1-fluoroethylene exceeds 25 parts by weight, and recovering resulting easily processed high copolymer.

2. The catalytic copolymerization of from 80 to 95 parts by weight ethylene with from 20 to 5 parts by weight 1-chloro-1-fluoroethylene at a temperature within the range of 35 to 125° C. and a pressure of at least 15,000 pounds per square inch in the presence of at least 10 parts water as the sole reaction medium.

3. The catalytic copolymerization of from 55 to 70 parts by weight ethylene with from 45 to 30 parts by weight 1-chloro-1-fluoroethylene at a temperature within the range of 35 to 125° C. and a pressure of at least 40,000 pounds per square inch in the presence of at least 10 parts water as the sole reaction medium.

4. A process which comprises polymerizing in the presence of from 10 to 500 parts by weight water as the sole reaction medium, 100 parts by weight of a monomeric mixture consisting of a major part by weight of ethylene and a minor part by weight of 1-chloro-1-fluoroethylene with a catalyst selected from the group consisting of azo and peroxy polymerization catalysts, at a temperature within the range of 35 to 125° C. and a pressure of at least 5,000 pounds per square inch with the further proviso that said pressure is at least 20,000 pounds per square inch when the 1-chloro-1-fluoroethylene content of said monomeric mixture exceeds 25 percent.

5. A process according to claim 4 wherein said catalyst is $\alpha,\alpha'$-azodiisobutyronitrile.

6. A process which comprises subjecting a monomeric material consisting of from 80 to 95 parts by weight ethylene and from 20 to 5 parts by weight 1-chloro-1-fluoroethylene to catalytic copolymerization in the presence of from 10 to 500 parts by weight water as the sole reaction medium, at a pressure of at least 15,000 pounds per square inch, and at a temperature of from 50 to 100° C., and recovering resulting normally solid copolymer having a tensile elongation in excess of 500 percent and a tensile strength in excess of 1,200 pounds per square inch and being readily processed on the hot mill.

References Cited in the file of this patent

UNITED STATES PATENTS

| | | |
| --- | --- | --- |
| 1,952,116 | Bridgman et al. | Mar. 27, 1934 |
| 2,397,260 | Hanford et al. | Mar. 26, 1946 |
| 2,409,996 | Roedel | Oct. 22, 1946 |
| 2,449,489 | Larson | Sept. 14, 1948 |
| 2,467,234 | Sargent et al. | Apr. 12, 1949 |
| 2,468,054 | Ford | Apr. 26, 1949 |
| 2,479,367 | Joyce et al. | Aug. 16, 1949 |
| 2,471,959 | Hunt | May 31, 1949 |